United States Patent Office 3,384,637
Patented May 21, 1968

3,384,637
16-METHYLATED CORTICOSTEROIDS
Patrick A. Diassi, Westfield, N.J., assignor to E. R. Squibb & Sons, Inc., New York, N.Y., a corporation of Delaware
No Drawing. Filed Jan. 18, 1966, Ser. No. 521,399
8 Claims. (Cl. 260—239.5)

ABSTRACT OF THE DISCLOSURE

The invention disclosed herein relates to 16-methylated corticosterones. These compounds have been found to have activity as anti-inflammatory agents.

---

This invention relates to and has for its object the provision of new physiologically active compounds and more particularly, compounds of the formula

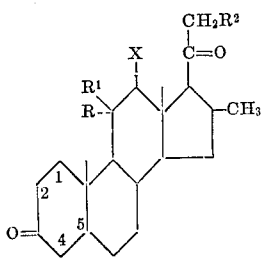

wherein R is hydrogen, $R^1$ and $R^2$ are the same or different and are selected from the group consisting of hydroxy and acyloxy; X is halogen (preferably chloro, bromo, or fluoro); and 1 and 2 is a saturated bond or unsaturated double bond and 4 and 5 is a saturated or unsaturated double bond.

The preferred acyl radicals of this invention are those of hydrocarbon carboxylic acids of less than twelve carbon atoms, as exemplified by the lower alkanoic acids (e.g., acetic, propionic, butyric and tert.-pentanoic acids), the lower alkenoic acids, the monocyclic aryl carboxylic acids (e.g., benzoic and toluic acids), the monocyclic aryl lower alkanoic acids (e.g., phenylacetic and β-phenylpropionic acids), the cyclcoalkane carboxylic and the cycloalkene carboxylic acids.

The compounds of the invention are useful as anti-inflammatory agents, particularly for topical use. Moreover, they possess the surprising and unpredictable advantage of exhibiting undesirable side effects to a lesser degree than other well-known anti-inflammatory substances.

The extent to which they cause reduction in the size and weight of the thymus gland, deposition of liver glycogen, elevation of blood sugar levels, adrenal atrophy, excretion of sodium and potassium, or protein breakdown is smaller in every instance than that obtained with known anti-inflammatory drugs. The novel compounds of this invention may be formulated for such administration, the concentration and/or dosage being based on the activity of the particular compound and the requirements of the patient.

The final products of this invention are prepared by the process of this invention which entails a number of steps beginning with a 12α-halo-16-dehydrocorticosterone-21-acetate (Compound A) as a starting material. The 16β-methyl derivative of the invention is prepared by treating the starting material, e.g., 12α-fluoro-16-dehydrocorticosterone 21-acetate with diazomethane, heating the 16α,17α-methyleneazo derivative obtained (Compound B) at 140 to 170° C. and hydrogenating the resulting 12α-fluoro-16-methyl-16-dehydrocorticosterone 21-acetate (Compound C) to 12α-fluoro-16β-methylcorticosterone 21-acetate (Compound D). Hydrogenation may be continued until two mole-equivalents are consumed in the reaction mixture to yield 12α-fluoro-16β-methyl-11β,21-dihydroxy-5α-pregnane-3,20-dione 21-acetate (Compound F). The 12α-halo-16β-methylcorticosterone 21-acetate intermediate of the invention is hydrolyzed with a base, such as potassium carbonate to form a 12α-halo-16β-methylcorticosterone (Compound E).

The 1-dehydrocorticosterone intermediates of this invention (Compound G) are prepared by bromination of the 12α-halo-16β-methyl, 11β,21-dihydroxy-5α-pregnane-3,20-dione 21-acetate intermediate followed by dihydrohalogenation. This intermediate may then be hydrolyzed in the manner set forth above to form a 12α-halo-16β-methyl-1-dehydrocorticosterone end product (Compound H). When the esters other than acetate of the above 11β-hydroxy compounds are desired, they may be prepared in the usual manner, as by treatment with the desired acid anhydride or acyl halide in an organic solvent (preferably in an organic base such as pyridine).

The following formulae and examples will illustrate the invention. All temperatures are in degrees centigrade unless otherwise specified:

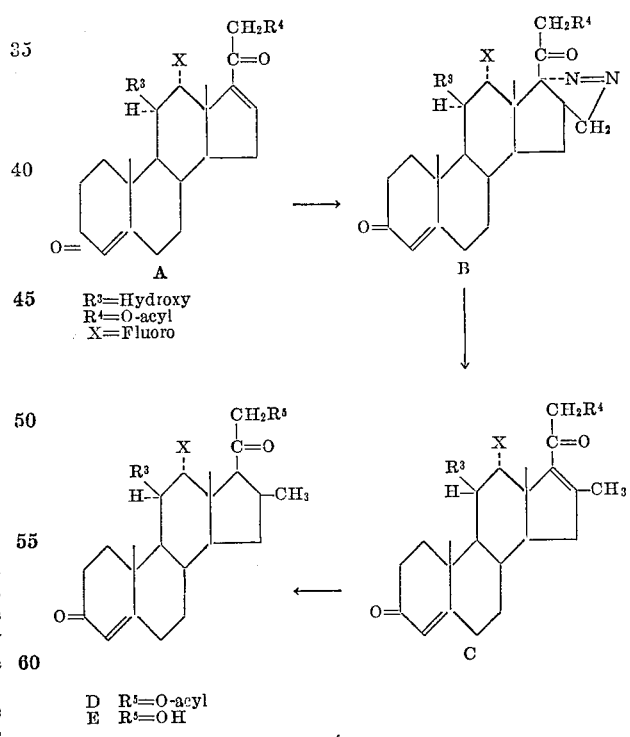

A
$R^3$=Hydroxy
$R^4$=O-acyl
X=Fluoro

D $R^5$=O-acyl
E $R^5$=OH

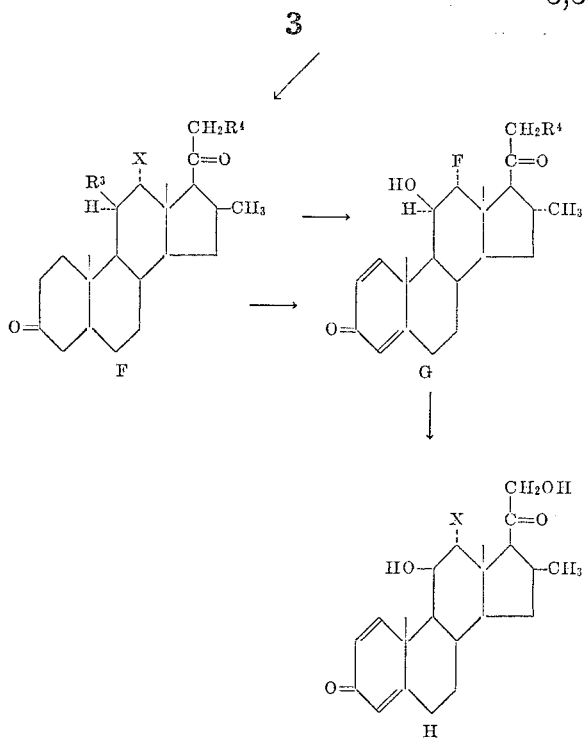

Example 1.—12α-fluoro-16α, 17α-methyleneazocorticosterone 21-acetate

A stream of diazomethane, generated by adding an ether solution of N-methyl-N-nitroso-p-toluenesulfonamide to a warm solution of potassium hydroxide in aqueous methanol-ether and swept by means of nitrogen, is passed into a solution of 200 mg. of 12α-fluoro-16-dehydrocorticosterone 21-acetate in 10 ml. of tetrahydrofuran and 10 ml. of ether until the diazomethane is no longer decolorized. After sixteen hours the precipitate is filtered, washed with ether and dried to give 12α-fluoro-16α,17α-methyleneazocortiscosterone 21-acetate.

Example 2.—12α-fluoro-16-methyl-16-dehydrocorticosterone 21-*acetate*

In a round bottom flash 100 mg. of 12α-fluoro-16α, 17α-methyleneazocorticosterone 21-acetate is heated under reduced pressure (<1.0 mm.) until an evolution of nitrogen is observed. The bath temperature is maintained at this temperature for ten minutes, then after cooling the residue is dissolved in chloroform and purified by chromatography to give 12α-fluoro-16-methyl-16-dehydrocorticosterone 21-acetate.

Example 3.—12α-fluoro-16β-methylcorticosterone 21-acetate

A solution of 100 mg. of 12α-fluoro-16-methyl-16-dehydrocorticosterone 21-acetate in 20 ml. of methanol is reduced at room temperature over 50 mg. of 25% palladium on calcium carbonate catalyst. After one mole-equivalent of hydrogen is taken up the reaction is stopped, the catalyst filtered and the filtrate taken to dryness. Purification of the residue by plate chromatography gives 12α-fluoro-16β-methylcorticosterone 21-acetate.

Example 4.—12α-fluoro-16β-methyl-11β,21-dihydroxy-5α-pregnane-3,20-dione 21-acetate Following the procedure of Example 3 but allowing the hydrogenation to continue until two mole-equivalents of hydrogen are consumed, there is obtained 12α-fluoro-16β-methyl - 11β - 21 - dihydroxy-5α-pregnane-3,20-dione 21-acetate.

Example 5.—12α-fluoro-16β-methyl-1-dehydrocorticosterone 21-acetate

A stirred solution of 370 mg. of 12α-fluoro-16β-methyl-11β,21-dihydroxy-5α-pregnane-3,20-dione 21-acetate in 15 ml. of chloroform and 0.15 ml. of acetic acid is cooled to 0° and a few drops of a solution of 292 mg. of bromine in ml. of acetic acid are added. After decolorization has occurred the remainder of the bromine solution is added dropwise with stirring. After five minutes a solution of 170 mg. of sodium acetate in 3 ml. of water is added, followed by a few drops of aqueous sodium bisulfite to destroy any remaining free bromine. The mixture is then diluted with water and extracted with chloroform. The chloroform is washed successively with water, 5% sodium bicarbonate and water, and evaporated under reduced pressure at a temperature less than 35° C. The residue is then dissolved in 10 ml. of dimethylformamide and 1 g. of sodium bromide is added and the mixture stirred under nitrogen at room temperature for one hour. Dimethylaniline (0.5 ml.) is then added and the mixture heated at 135° for 2.5 hours under nitrogen. It is then cooled and added slowly with stirring to a mixture of 0.35 ml. of concentrated hydrochloric acid in 15 ml. of water. The precipitate is stirred at 10° C. for three hours, then filtered, washed with water and dried. Crystallization of the precipitate from acetone-hexane gives 12α-fluoro-16β-methyl-1-dehydrocorticosterone 21-acetate.

Example 6.—12α-fluoro-16β-methylcorticosterone

To an oxygen-free solution of 100 mg. of 12α-fluoro-16β-methylcorticosterone 21-acetate in 10 ml. of methanol is added 1.0 ml. of an oxygen-free aqueous 10% potassium carbonate solution and the mixture left at room temperature under nitrogen for one hour. The solution is then neutralized with 10% acetic acid and slowly diluted with water. The crystals which separate are filtered, washed with water and dried to give 12α-fluoro-16β-methylcorticosterone.

Following the procedures of Examples 1, 2, 3, 4, 5, and 6, utilizing 12α-bromo-16-dehydrocorticosterone or 12α-chloro-16-dehydrocorticosterone in lieu of 12α-fluoro-16-dehydrocorticosterone as the starting material, the products formed will be 12α-bromo-16α,17α-methyleneazocorticosterone 21 - acetate; 12α - chloro-16α,17α-methyleneazocorticosterone 21-acetate; 12α-bromo-16-methyl-16-dehydrocorticosterone 21-acetate; 12α-chloro-16-methyl-16-dehydrocorticosterone 21 - acetate; 12α-bromo-16β-methylcorticosterone 21-acetate; 12α-chloro-16β-methylcorticosterone 21-acetate; 12α - bromo-16β-methyl-11β,21-dihydroxy-5α-pregnane - 3,20 - dione 21-acetate; 12α - chloro - 16β-methyl-11β,21-dihydroxy-5α-pregnane-3,20-dione 21-acetate; 12α-bromo-16β-methyl-1-dehydrocorticosterone 21 - acetate; 12α - chloro-16β, methyl-1-dehydrocorticosterone 21-acetate; 12α-bromo-16β-methylcorticosterone; and 12α-chloro-16β-methylcorticosterone.

Example 7.—12α-fluoro-16β-methyl-1-dehydrocorticosterone

Following the procedure of Example 6 but substituting 12α-fluoro-16β-methyl-1-dehydrocorticosterone 21-acetate for 12α-fluoro-16β-methylcorticosterone 21-acetate there is obtained 12α-fluoro-16β-methyl-1-dehydrocorticosterone.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:
1. A compound having the formula

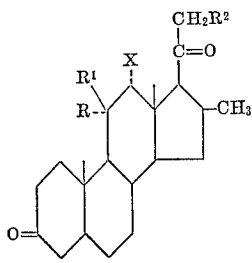

or

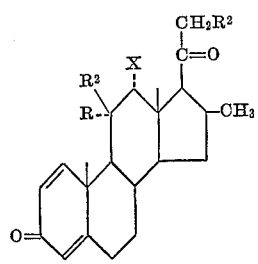

wherein R is hydrogen; $R^1$ is hydroxy; $R^2$ is hydroxy or acyloxy; and X is halogen.

2. A compound in accordance with claim 1 wherein R, $R^1$, $R^2$, X and 1,2- are as defined in claim 1 and 4,5- is a saturated bond having the name 12α-fluoro-16β-methyl - 11β,21 - dihydroxy-5α-pregnane-3,20-dione 21-acetate.

3. A compound in accordance with claim 1 wherein R, $R^1$, $R^2$, X and 4,5- are as defined in claim 1 and 1,2- is unsaturated having the name 12α-fluoro-16β-methyl-1-dehydrocorticosterone 21-acetate.

4. A compound in accordance with claim 1 wherein R, $R^1$, X, 4,5- are as defined in claim 1; $R^2$ is hydroxy and 1,2- is unsaturated having the name 12α-fluoro-16β-methyl-1-dehydrocorticosterone.

5. A compound having the formula

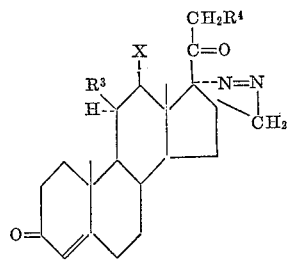

wherein $R^3$ and $R^4$ are selected from the group consisting of hydroxy and acyloxy and X is halo.

6. A compound in accordance with claim 5 wherein $R^3$ is hydroxy; $R^4$ is acetoxy and X is fluoro having the name 12α-fluoro-16α,17α-methyleneazocorticosterone 21-acetate.

7. A compound having the formula

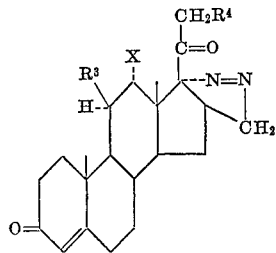

wherein $R^3$ is hydroxy and $R^4$ is selected from the group consisting of hydroxy and acyloxy and X is halo.

8. A compound in accordance with claim 7 wherein $R^3$ is hydroxy; $R^4$ is acetoxy and X is fluoro having the name 12α-fluoro-16-methyl-16-dehydrocorticosterone 21-acetate.

References Cited

UNITED STATES PATENTS 3,049,556   8/1962   Hirschmann _____ 260—397.45

ELBERT L. ROBERTS, *Primary Examiner.*

UNITED STATES PATENT OFFICE
CERTIFICATE OF CORRECTION

Patent No. 3,384,637                                           May 21, 1968

Patrick A. Diassi

It is hereby certified that error appears in the above numbered patent requiring correction and that the said Letters Patent should read as corrected below.

Column 3, line 47, "flash" should read -- flask --.
Column 4, line 7, "in ml." should read -- in 5 ml. --. Column 6, line 13, "$R^3$ and $R^4$ are" should read      -- $R^3$ is hydroxy and $R^4$ is --;

line 19, beginning with "7. A compound" cancel all to and including "and X is halo." in line 31, same column 6, and insert instead -- 7. A compound having the structure

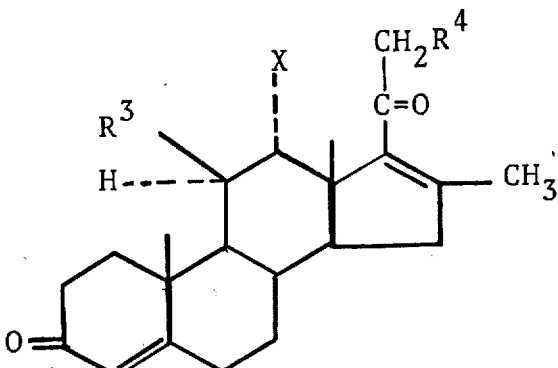

wherein $R^3$, $R^4$ and X are as defined in claim 5. --.

Signed and sealed this 11th day of November 1969.

(SEAL)
Attest:

EDWARD M. FLETCHER, JR.                        WILLIAM E. SCHUYLER, JR.
Attesting Officer                                    Commissioner of Patents